(12) United States Patent
Byun et al.

(10) Patent No.: US 9,607,009 B2
(45) Date of Patent: Mar. 28, 2017

(54) AUTOMATICALLY BRANDING TOPICS USING COLOR

(71) Applicant: Google Inc., Mountain View, CA (US)

(72) Inventors: Melissa Youngju Byun, Cambridge, MA (US); Jokubas Zukerman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 14/136,326

(22) Filed: Dec. 20, 2013

(65) Prior Publication Data

US 2015/0178276 A1    Jun. 25, 2015

(51) Int. Cl.
*G06F 7/00* (2006.01)
*G06F 17/30* (2006.01)

(52) U.S. Cl.
CPC .... *G06F 17/3025* (2013.01); *G06F 17/30705* (2013.01)

(58) Field of Classification Search
CPC .............. G06F 17/30; G06F 17/30247; G06F 17/3025; G06F 17/30321; G06F 17/30864; G06F 17/30705; G07D 7/2016
See application file for complete search history.

(56) References Cited

U.S. PATENT DOCUMENTS

| | | | | |
|---|---|---|---|---|
| 5,526,443 A * | 6/1996 | Nakayama | ........ | G06F 17/30696 382/173 |
| 5,815,830 A * | 9/1998 | Anthony | ............. | G06F 17/3089 707/758 |
| 2003/0167252 A1 * | 9/2003 | Odom | ............... | G06F 17/30616 |
| 2003/0212746 A1 * | 11/2003 | Fitzpatrick | .......... | H04L 12/1827 709/206 |
| 2004/0205631 A1 * | 10/2004 | Keohane | ........... | G06F 17/30899 715/273 |
| 2005/0065916 A1 * | 3/2005 | Ge | ...................... | G06Q 30/0251 |
| 2006/0041530 A1 * | 2/2006 | Milic-Frayling | . | G06F 17/30867 |
| 2006/0129549 A1 * | 6/2006 | Bozak | ............... | G06F 17/30864 |
| 2008/0247731 A1 * | 10/2008 | Yamauchi | ............... | G06F 21/10 386/259 |
| 2010/0277497 A1 * | 11/2010 | Dong | .................... | G06T 11/001 345/589 |
| 2013/0110823 A1 * | 5/2013 | Su | ..................... | G06F 17/30867 707/723 |
| 2013/0229429 A1 * | 9/2013 | Mi | .......................... | G09G 5/02 345/593 |
| 2013/0246430 A1 * | 9/2013 | Szucs | ................ | G06F 17/30011 707/738 |
| 2014/0289231 A1 * | 9/2014 | Palmert | ............. | G06F 17/30719 707/723 |
| 2014/0372566 A1 * | 12/2014 | Milne | ............... | G06F 17/30867 709/219 |
| 2015/0113388 A1 * | 4/2015 | Barrett | ................ | G06F 17/3053 715/249 |

\* cited by examiner

*Primary Examiner* — Augustine K Obisesan
(74) *Attorney, Agent, or Firm* — Fenwick & West LLP

(57) ABSTRACT

Embodiments of the invention automatically assign colors to topics in a topic database based on a respective topic's unique identifier within the topic database. One or more functions are applied to transform each topic's unique identifier into a respective color, for example by hashing the unique identifier string, and using the hash to index into an array of colors. Thus, content items pertaining to the same topic can be consistently branded with the same color in visual presentations to the user.

12 Claims, 9 Drawing Sheets

AUTOMATICALLY BRANDING TOPICS USING COLOR

FIELD OF DISCLOSURE

This disclosure relates generally to the presentation of content items to a user on a computing device and specifically to the use of color to distinguish topics of the content items.

DESCRIPTION OF THE RELATED ART

Many people use their computing devices to consume content. For example, it is common for people to read email, articles, blogs, books, and other forms of content from their computing devices. Because of the extreme amounts of content that are available electronically, it is impossible for any person to consume it all. Thus, users tend to be selective in terms of the content items that they decide to read.

To aid the user in deciding what to read, some content presentation systems use color as a quick visual indicator to signal the topic to which a content item pertains. After repeated exposure, users may come to associate certain topics with certain colors. The color may become an identifying mark (i.e., a brand) for the associated topic. However, typically the color applied to a topic is manually assigned, for example as the result of an editorial choice. Thus, when a new topic is added, a new color must be manually assigned to the topic.

SUMMARY

Embodiments of the invention automatically assign colors to topics in a topic database based on a respective topic's unique identifier within the topic database. One or more functions are applied to transform each topic's unique identifier into a respective color, for example by hashing the unique identifier string, and using the hash to index into an array of colors. Thus, content items pertaining to the same topic can be consistently branded with the same color in visual presentations to the user.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIGS.) and the following description describe certain embodiments by way of illustration only. One skilled in the art will readily recognize from the following description that alternative embodiments of the structures and methods illustrated herein may be employed without departing from the principles described herein.

DETAILED DESCRIPTION

Figure 1:
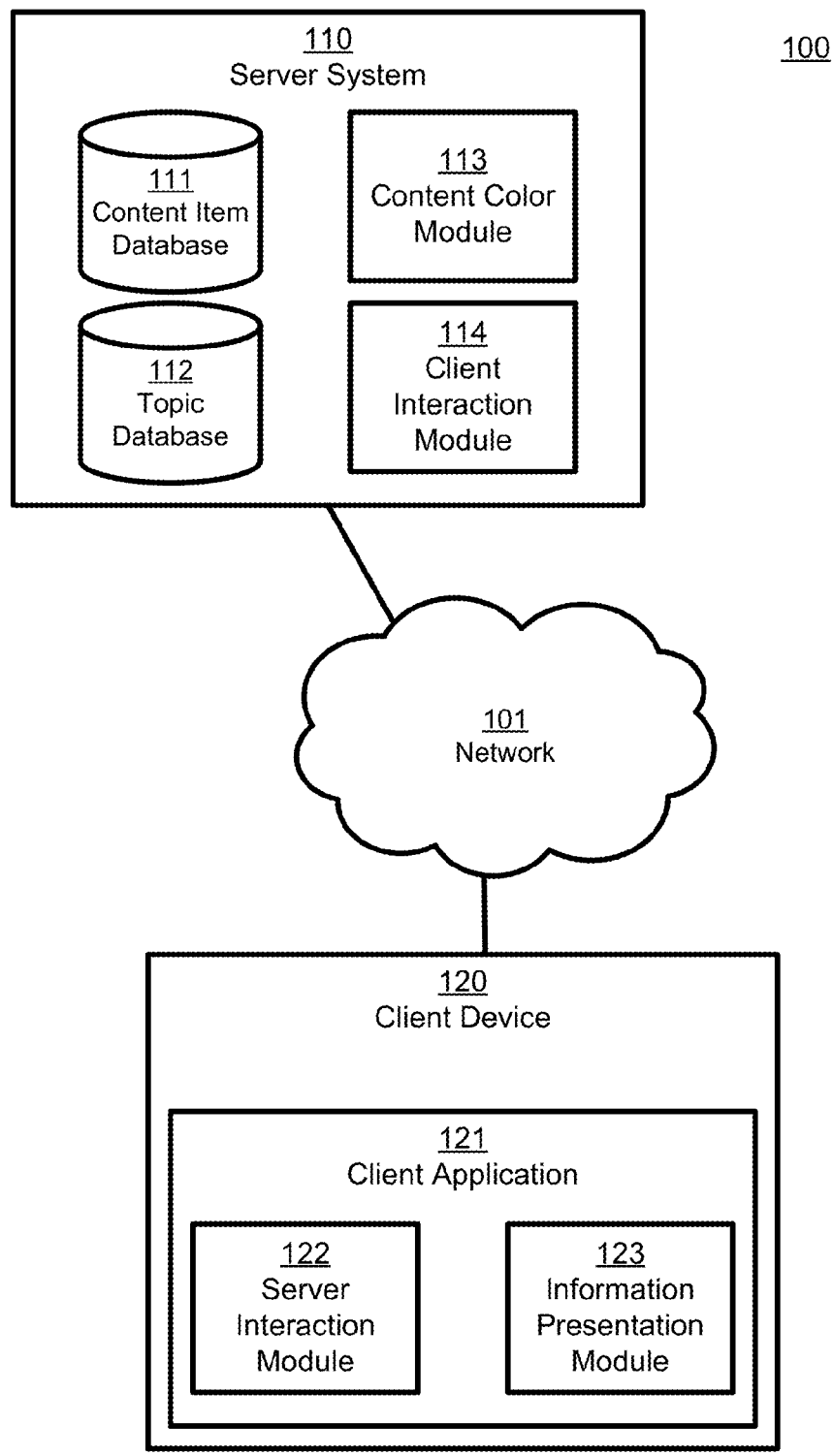
FIG. 1 is a high-level block diagram illustrating an embodiment of an environment for presenting content items on a client device.

FIG. 1 is a high-level block diagram illustrating an embodiment of an environment 100 for presenting content items on a client device 120. The environment 100 includes a server system 110 and a client device 120 connected by a network 101. Only one server system 110 and one client device 120 are illustrated, but in practice there may be multiple instances of each of these entities. For example, there may be thousands or millions of client devices 120 in communication with several or many server systems 110.

The server system 110 selects and serves content items to the client device 120. In some embodiments, the server system 110 is implemented as a single server, while in other embodiments it is implemented as a distributed system of multiple servers. The server system 110 includes a content item database 111, a topic database 112, a content color module 113, and a client interaction module 114.

The content item database 111 of the server system 110 stores content items for distribution to client devices 120. The content items may be, for example, news articles, photographs, blog postings, status updates, advertisements, or any other type of content items that may displayed on a client device 120.

The topic database 112 contains a comprehensive listing of topics of the content items. In one embodiment, the topic database 112 contains a list of entities, such as people, organizations, places, and other things that may be the subject of content items and provides a group of any known aliases for each entity, including equivalents in many different languages. For each topic, the topic database 112 provides a unique identifier. Thus, in one implementation, regardless of the language in which a topic is expressed, the topic has the same unique identifier in the topic database 112. The topic database 112 may be part of a large collaborative knowledge base comprising structured data harvested from many sources. In one implementation, the topic database is a Freebase database available from GOOGLE INC. of Mountain View, Calif. The topic database 112 need not be static. As new topics are added to the topic database 112, each is assigned a new unique identifier which is stored in the topic database.

The content color module 113 accesses items from the content item database 111 to serve to the client device 120, identifies the topic of the content item, and determines the color to apply to visual presentations of the content item. In some implementations, the content color module 113 resides on the server system 110 as illustrated in FIG. 1, and in other implementations the content color module 113 resides on the client device 120, or the functionality of the content color module 113 may be split among modules on the server system 110 and the client device 120 in various ways. The operation of the content color module 113 will be described in greater detail below with reference to FIGS. 3-4.

The client interaction module 114 manages the interactions of the server system 110 with the client device 120. Specifically, the client interaction module 114 communicates content items to the client device 120, and communicates the color determined by the content color module 113 that is associated with a respective topic of each content item.

The client device 120 is a computing device, such as a desktop, laptop, or tablet computer, or a smart phone or other mobile computing device. The client device 120 is used by a user to access content items through a client application 121 for example for information or entertainment purposes.

The client application 121 is a software application, for example running within the operating system of the client device 120. The software application contains program modules to implement the functionality described herein. Specifically, as illustrated in this example, the client application 121 includes a server interaction module 122 and an information presentation module 123.

The server interaction module 122 of the client application 121 manages the interactions of the client application 121 with the server system 110. The server interaction module 122 communicates data between the client device 120 and the server system 110 via the network 101. The server interaction module 122 sends requests for content via the network 101 to the sever system 110. Additionally, the server interaction module 122 receives content items and the color determined to be associated with a respective topic of each content item from the server system 110, either in response to requests from the client application 121 or in response to the server system 110 pushing content items to the client application 121 without them being specifically requested.

The information presentation module 123 formats the content items received from the server system 110 for presentation on the client device 120 to the user. The information presentation module 123 may apply the color corresponding to the topic of each content item to the respective content item for display to the user. Examples of the use of color to consistently brand content items pertaining to the same topic are described below with reference to FIGS. 5A-E.

The network 101 provides a communication infrastructure between the server system 110 and the client device 120. The network 101 is typically the Internet, but may be any network, including but not limited to a Local Area Network (LAN), a Metropolitan Area Network (MAN), a Wide Area Network (WAN), a mobile wired or wireless network, a private network, or a virtual private network.

Figure 2:
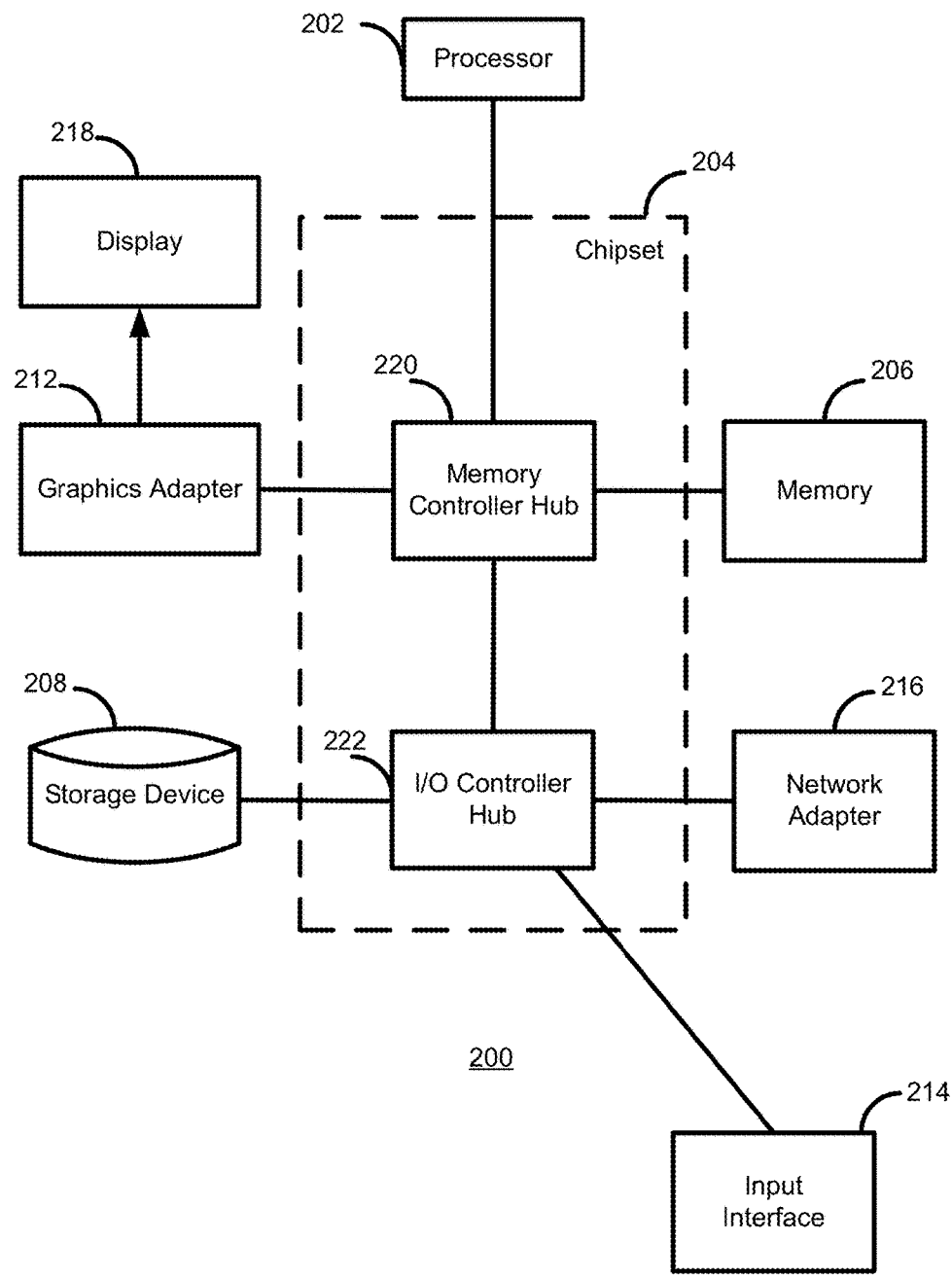
FIG. 2 is a high-level block diagram illustrating an example computer for implementing the entities shown in FIG. 1.

FIG. 2 is a high-level block diagram illustrating an example computer for implementing one or more of the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, or some combination thereof, and is used to input data into the computer 200. In some embodiments, the computer 200 may be configured to receive input (e.g., commands) from the input interface 214 via gestures from the user. Gestures are movements made by the user while contacting a touch-screen interface. For example, tapping a portion of the screen, touching a portion of the screen and then dragging the touched portion in a particular direction, etc. The computers 200 monitors gestures made by the user and converts them into commands (e.g., dismiss, maximize, scroll, etc.) The graphics adapter 212 displays images and other information on the display 218. The network adapter 216 couples the computer 200 to one or more computer networks, such as network 101.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computer 200 used by the entities of FIG. 1 can vary depending upon the embodiment and the processing power required by the entity. For example, the server system 110 may include multiple computers 200 communicating with each other through a network to provide the functionality described herein. Such computers 200 may lack some of the components described above, such as graphics adapters 212 and displays 218.

Figure 3:
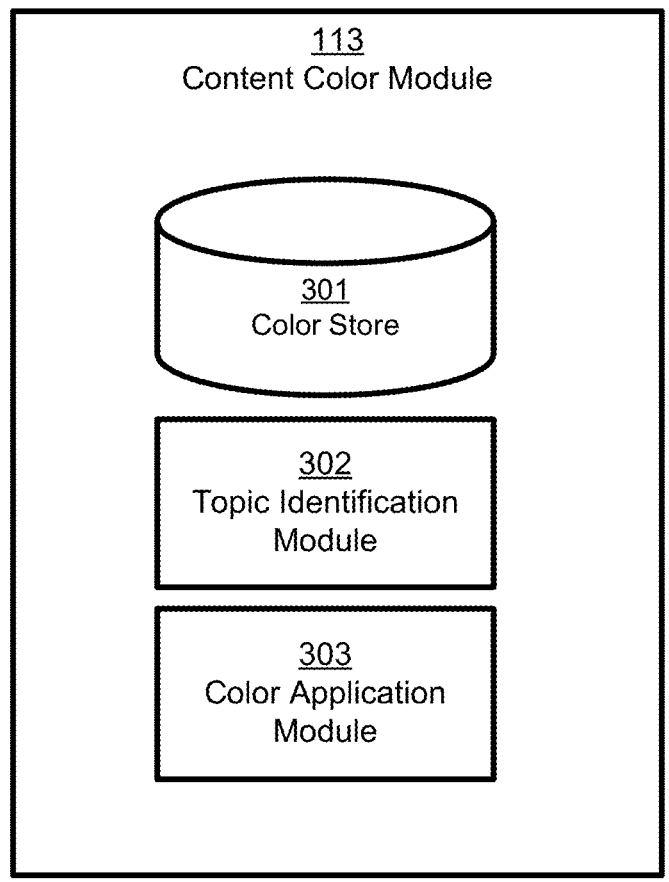
FIG. 3 is a block diagram illustrating a content color module in accordance with an embodiment.

FIG. 3 is a block diagram illustrating a content color module 113 of the server system 110 in accordance with an embodiment. Although the content color module 113 is described in this example as residing within the server system 110, in another embodiment, the content color module 113 may be included in the client application 121 on the client device 120 or the functionality of the content color module 113 may be split among modules on the server system 110 and on the client device 120 instead. The content color module 113 includes a color store 301, a topic identification module 302, and a color application module 303.

The color store 301 stores an array of colors to be associated with one or more topics. Depending on the implementation, the number of colors may vary from a few dozen to many hundreds or thousands. In the case that the number of topics exceeds the number of colors, colors may be reused for additional topics.

The topic identification module 302 analyzes the content item to determine the primary topic of the content item. The topic identification module 302 may parse the text of a content item to identify entities discussed therein, analyze metadata and/or extract tags associated with the content item, or use any other technique known to those of skill in the art for identifying the primary topic of a content item. In one embodiment, when a content item is about multiple topics, each of the multiple topics is scored according to techniques known in the art for assessing the relevance of a topic to a content item, and the highest scoring topic is identified as the primary topic of the content item.

The color application module 303 determines the color associated with the topic of a content item and applies the color to visual presentations of the content item. The application of a consistent color to a topic helps differentiate topics, allows the user to recall favorite topics by color, and generally adds visual appeal to the user interface. In one embodiment, the color application module 303 determines the color associated with the topic of a content item by accessing the unique identifier of the topic in the topic database 112. The color application module 303 applies one or more functions to transform the topic's unique identifier into a respective color, for example by hashing the unique identifier string, and using the hash to index into the array of colors in the color store 301, for instance where $$\text{Index} = \frac{|id \cdot hashCode(\ )|}{\text{number of colors}} \quad \text{Eq. (1)}$$

Variations of Eq. 1 may be used provided that the mapping between each topic's unique identifier to a respective color from the color store 301 is consistently reproducible. This allows the color application module 303 to operate even on newly added topics to the topic database 112 without manual intervention. Provided the newly added topic is associated with a unique identifier in the topic database 112, the newly added topic can be mapped automatically to one of the colors from the color store 301.

Figure 4:
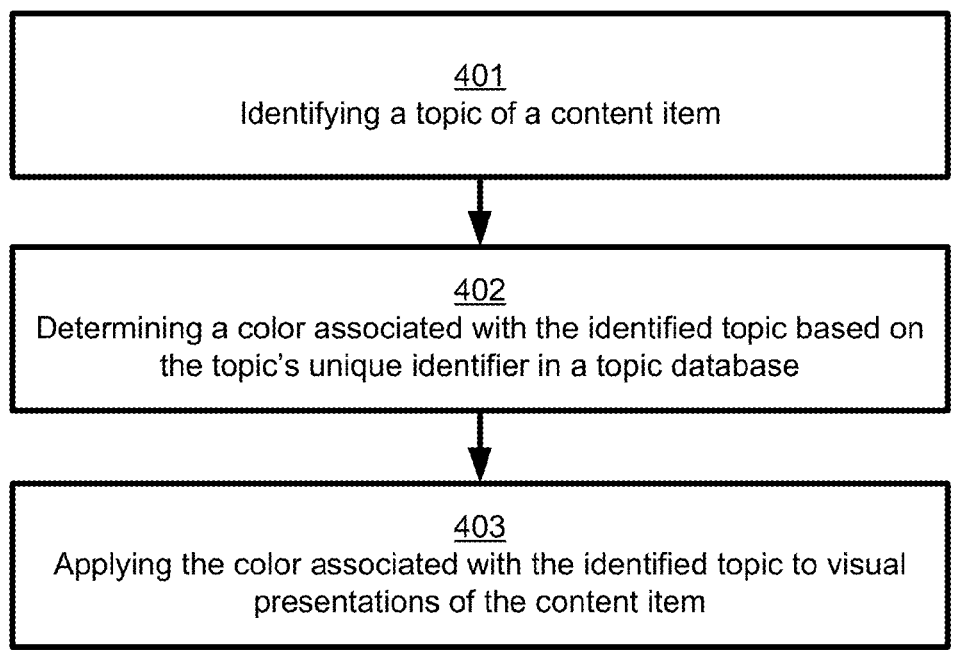
FIG. 4 is a flowchart illustrating a method of applying a consistent respective color to content items associated with a respective topic in accordance with an embodiment.

FIG. 4 is a flowchart illustrating a method of applying a consistent respective color to content items associated with a respective topic in accordance with an embodiment. This example method is described from the perspective of a content color module 113 of the server system 110 performing the method, but in some variations, the content color module 113 may instead reside within the client application 121 of the client device 120, or the method may be performed by a combination of modules from the server system 110 and the client device 120. In some implementations, the steps are performed in an order other than the order presented in FIG. 4, and in other implementations, additional or alternative steps may be performed.

In step 401, a topic of a content item is identified. For example, the topic identification module 302 of the content color module 113 analyzes the content item to determine the primary topic, as described above.

In step 402, a color associated with the identified topic is determined based on the topic's unique identifier in a topic database 112. For example, the color application module 303 of the content color module 113 determines the color associated with the topic by accessing the unique identifier of the topic in the topic database 112 and applying at least one function to transform the topic's unique identifier into a respective color. As described above, for example, the function may hash the unique identifier string of the topic from the topic database 112, and use the result to index into the array of colors in the color store 301.

In step 403, the color associated with the identified topic is applied to visual presentations of the content item. For example, the color application module 303 may apply the color associated with the identified topic to icons, tags, texts, backgrounds, as an image tint, or any combination of these and/or may send instructions to the information presentation module 123 of the client application 121 to display visual presentations of the content item with the color associated with the identified topic.

In one variation of the method illustrated in FIG. 4, all content items relating to all topics are displayed in a default color scheme (such as grey) until a user has indicated an interest in following a topic, for example by subscribing to it. At that point, color is applied to topics the user is following as a form of visual identity that helps differentiate topics, allows the user to recall favorite topics by color, and generally adds visual appeal to the user interface.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server system 110 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server system 110.

Figure 5A:
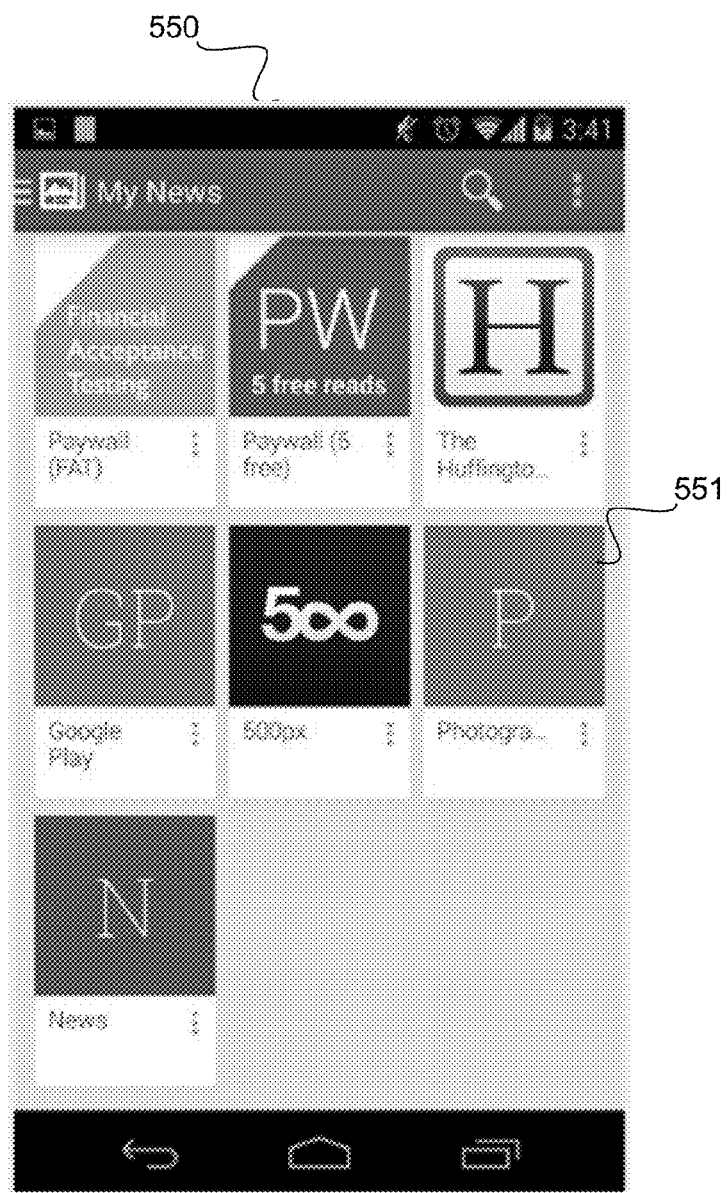
FIG. 5A-E illustrates examples of the use of a consistent color to brand a topic within the user interface of a client application in accordance with an embodiment.
Figure 5B:
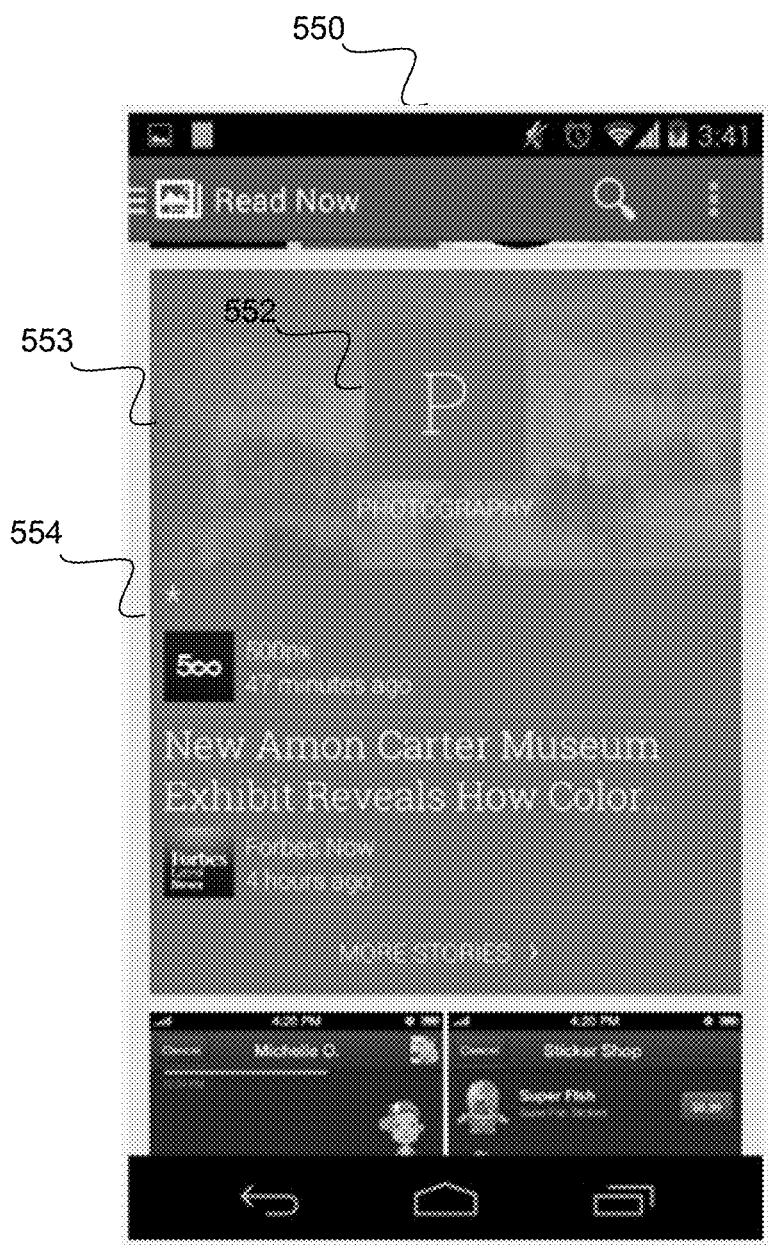
Figure 5C:
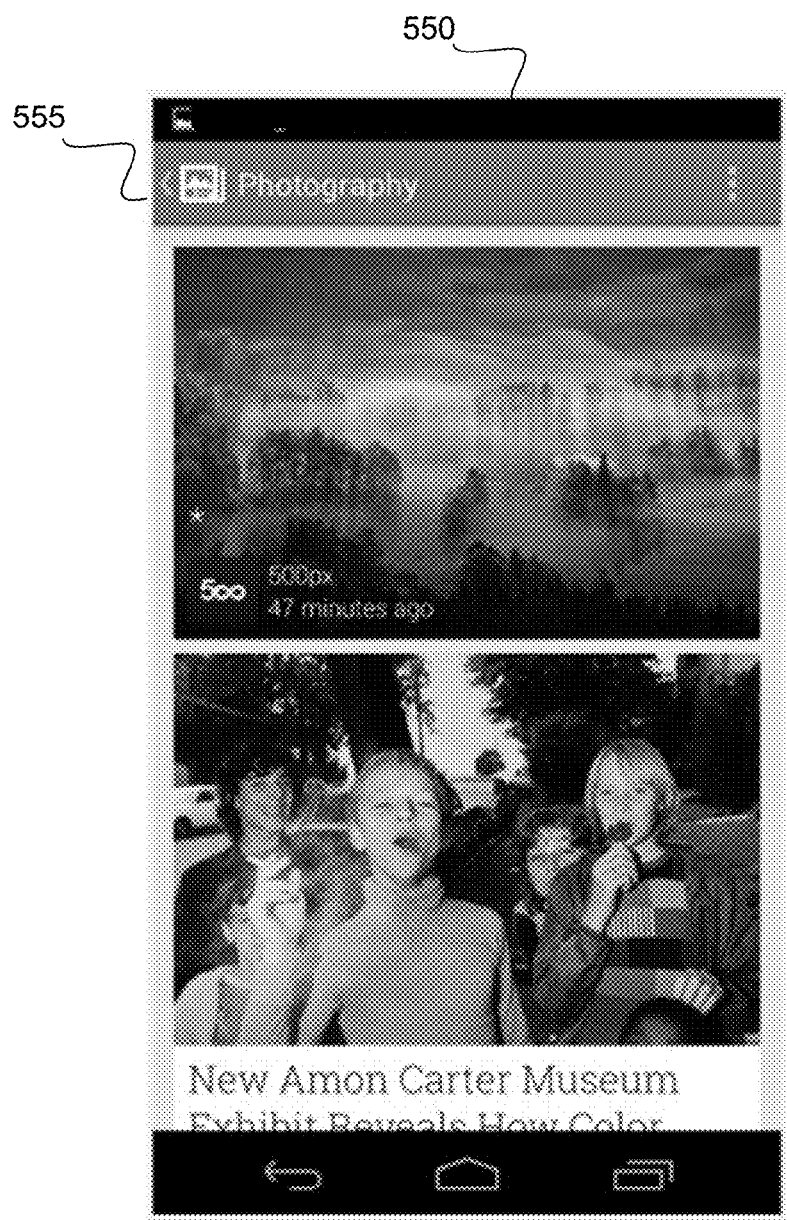
Figure 5D:
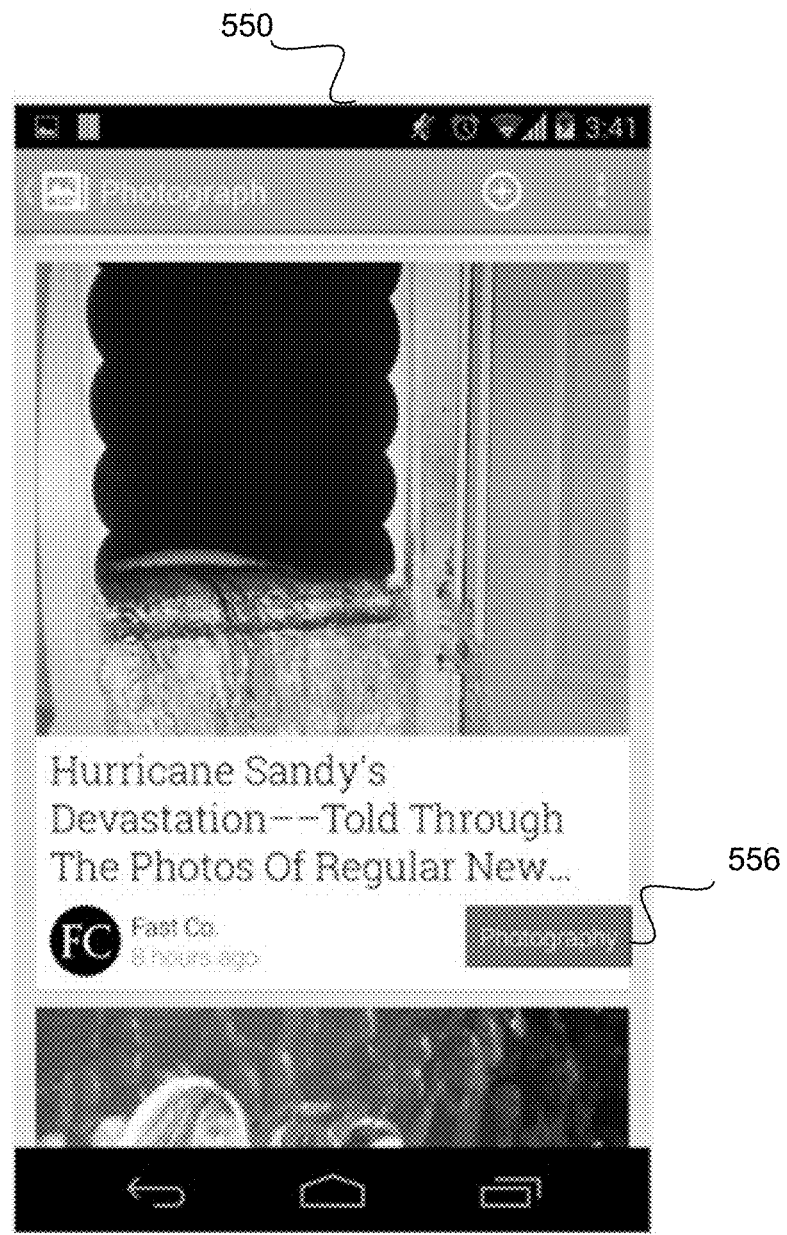
Figure 5E:
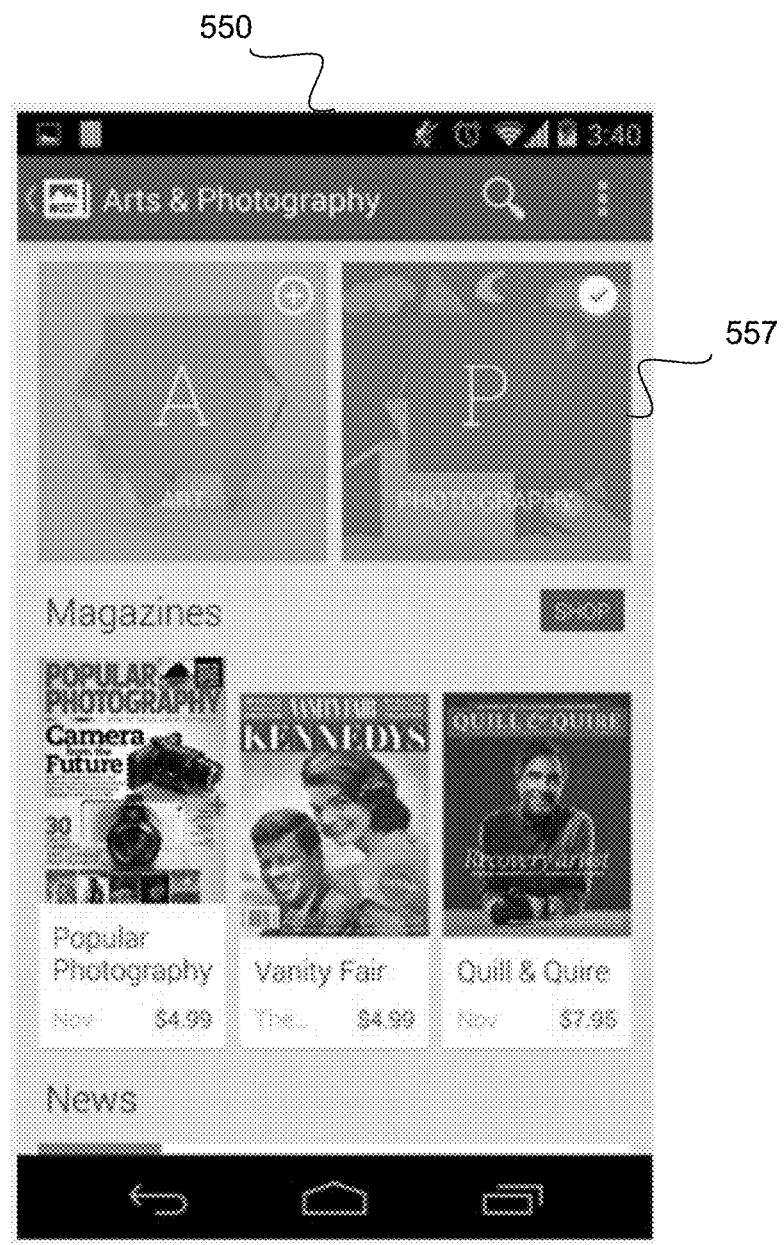

FIG. 5A-E illustrates examples of the use of a consistent color to brand a topic within the user interface of a client application in accordance with an embodiment. FIG. 5A illustrates an example of a user interface 550 of the client application 121 of a client device 120 displaying a light blue icon 551 corresponding to the topic of photography. In this example, the light blue shade is associated with the topic of "photography" and can be used throughout the user interface 550 of the client application 121 to consistently brand the topic. In FIG. 5B, the same light blue shade has been used again to color the photography icon 552, to tint an image 553 related to the photography topic, and as a background color 554 of a news article about photography. FIG. 5C illustrates the use of the same light blue shade as a background color to a heading 555 identifying the topic of the photography article. FIG. 5D illustrates the use of the same light blue shade as part of a tag 556 that identifies the topic of a related content item. FIG. 5E illustrates the use of the same light blue shade as part of an icon placed on top of a tinted image 557 as an example variation of how a color associated with a topic may be used within the user interface 550 of the client application 121. Many other variations are also possible.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated dictionary generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method of automatically branding a topic with color, the method comprising:
   identifying a primary topic of a content item by analyzing the content item to determine the primary topic from among multiple topics in the content item;
   accessing a topic database to determine a unique identifier stored in the topic database and associated with the identified primary topic of the content item;
   determining a color associated with the identified primary topic based on the unique identifier of the topic in the topic database by applying at least one function to transform the topic's unique identifier into a color, determining the color comprising:
      hashing the unique identifier to produce a hash value;
      dividing the hash value by a number of available colors to produce an index value; and
      using the index value as an index into an array of colors in a color store to select the color associated with the identified primary topic; and
   applying the color associated with the identified primary topic to textual objects and non-textual objects included in the content item that are associated with the identified primary topic.

2. The method of claim 1, wherein the content item comprises a news article, a photograph, a blog posting, or a status update.

3. The method of claim 1, wherein the topic database comprises a group of any known aliases for each entity and a unique identifier for each entity.

4. The method of claim 1, further comprising:
   identifying the textual objects and non-textual objects included in the content item;
   determining for each of the textual objects and non-textual objects an associated topic; and
   wherein the color associated with the identified primary topic is applied to textual objects and non-textual objects having associated topics that match the primary topic.

5. The method of claim 4, wherein determining for each of the non-textual objects an associated topic comprises:
   analyzing at least one of metadata or tags associated with the non-textual object to determine the topic associated with the non-textual object.

6. The method of claim 1, wherein non-textual objects include a background of the content item or an image included in the content item.

7. A non-transitory computer-readable storage medium storing executable computer program instructions for automatically branding a topic with color, the instructions executable to perform steps comprising:
   identifying a primary topic of a content item by analyzing the content item to determine the primary topic from among multiple topics in the content item;
   accessing a topic database to determine a unique identifier stored in the topic database and associated with the identified primary topic of the content item;
   determining a color associated with the identified primary topic based on the unique identifier of the topic in the topic database by applying at least one function to transform the topic's unique identifier into a color, determining the color comprising:
      hashing the unique identifier to produce a hash value;
      dividing the hash value by a number of available colors to produce an index value; and
      using the index value as an index into an array of colors in a color store to select the color associated with the identified primary topic; and
   applying the color associated with the identified primary topic to textual objects and non-textual objects included in the content item that are associated with the identified primary topic.

8. The medium of claim 7, wherein the content item comprises a news article, a photograph, a blog posting, or a status update.

9. The medium of claim 7, wherein the topic database comprises a group of any known aliases for each entity and a unique identifier for each entity.

10. A system for automatically branding a topic with color, the system comprising:
    a processor configured to execute modules; and
    a memory storing the modules, the modules executable to perform steps comprising:
       identifying a primary topic of a content item by analyzing the content item to determine the primary topic from among multiple topics in the content item;
       accessing a topic database to determine a unique identifier stored in the topic database and associated with the identified primary topic of the content item;
       determining a color associated with the identified primary topic based on the unique identifier of the topic in the topic database by applying at least one function to transform the topic's unique identifier into a color, determining the color comprising:
          hashing the unique identifier to produce a hash value;
          dividing the hash value by a number of available colors to produce an index value; and
          using the index value as an index into an array of colors in a color store to select the color associated with the identified primary topic; and
       applying the color associated with the identified primary topic to textual objects and non-textual objects included in the content item that are associated with the identified primary topic.

11. The system of claim 10, wherein the content item comprises a news article, a photograph, a blog posting, or a status update.

12. The system of claim 10, wherein the topic database comprises a group of any known aliases for each entity and a unique identifier for each entity.

\* \* \* \* \*